(12) United States Patent
Drum

(10) Patent No.: US 8,002,126 B1
(45) Date of Patent: Aug. 23, 2011

(54) PORTABLE SURF BOARD RACK AND HOLDER

(76) Inventor: Jerry Drum, Winter Haven, FL (US)

(*) Notice: Subject to any disclaimer, the term of this patent is extended or adjusted under 35 U.S.C. 154(b) by 0 days.

(21) Appl. No.: 12/641,867

(22) Filed: Dec. 18, 2009

(51) Int. Cl.
A47F 7/00 (2006.01)

(52) U.S. Cl. ...... 211/85.7; 211/70.8; 211/195; 248/156; 248/533

(58) Field of Classification Search .......... 211/85.7, 211/60.1, 62, 70.2, 70.5, 70.4, 70.8, 195; 248/530, 533, 156, 166; 108/159.12, 153.1, 108/157.1, 157.17; 182/181.1, 151, 186.5, 182/153
See application file for complete search history.

(56) References Cited

U.S. PATENT DOCUMENTS

| | | | |
|---|---|---|---|
| 982,302 A * | 1/1911 | Roncaglia | 248/166 |
| 2,874,003 A | 2/1959 | Humphries | |
| 2,897,911 A | 8/1959 | Bowers | |
| 3,208,408 A * | 9/1965 | Maslow | 108/148 |
| 3,276,545 A | 10/1966 | D'Angelo | |
| 3,572,045 A * | 3/1971 | Owen | 405/212 |
| 3,837,328 A * | 9/1974 | Schaffer | 126/29 |
| 3,871,526 A * | 3/1975 | Marsack | 211/189 |
| 4,582,203 A * | 4/1986 | Davis | 211/70.8 |
| D324,951 S * | 3/1992 | Narramore | D6/552 |
| 5,211,364 A | 5/1993 | James | |
| D352,628 S | 11/1994 | James | |
| 5,402,596 A * | 4/1995 | Gillming, Jr. | 43/54.1 |
| D381,853 S | 8/1997 | Funcich | |
| 5,733,000 A | 3/1998 | Stump | |
| 5,755,342 A * | 5/1998 | Hoffman | 211/64 |
| 5,833,079 A | 11/1998 | Roberts | |
| 5,941,396 A * | 8/1999 | Le Vert | 211/13.1 |
| 6,315,133 B1 * | 11/2001 | Franke | 211/70.2 |
| 6,390,309 B1 | 5/2002 | Tucker | |
| 6,457,619 B1 * | 10/2002 | Werner et al. | 224/405 |
| 6,691,973 B1 * | 2/2004 | Barfield | 248/530 |
| 6,776,106 B2 * | 8/2004 | Lin | 108/157.1 |
| 7,041,001 B1 * | 5/2006 | Rogers | 473/282 |
| D562,016 S | 2/2008 | Tomasch et al. | |
| D596,480 S * | 7/2009 | Murphy | D8/356 |
| D605,872 S * | 12/2009 | Gharst | D6/416 |
| 2003/0178382 A1 | 9/2003 | Tucker | |
| 2007/0102380 A1 | 5/2007 | Shaw | |
| 2007/0125731 A1 | 6/2007 | Waterman | |
| 2007/0248420 A1 * | 10/2007 | Jacobs et al. | 405/218 |
| 2009/0039225 A1 | 2/2009 | Taylor | |

* cited by examiner

*Primary Examiner* — Korie Chan
(74) *Attorney, Agent, or Firm* — Brian S. Steinberger; Law Offices of Brian S. Steinberger, P.A.

(57) ABSTRACT

Devices, apparatus, systems and methods for supporting and holding items including surfboards, fishing rods, beach items and tabletops in horizontal positions raised above ground surfaces such as at the beach, and be easily transported, assembled, and disassembled when not being used. The racks can include a pair of horizontal beams. Each of the beams can have legs pivotally attached to ends of each beam. The legs can have storage positions with the legs folded up and parallel to the beams, and extended positions with the legs perpendicular to the beams and having lower ends staked into the grounds. The rack can support tabletops and surfboards in horizontal flat positions on top of the assembled horizontal beams. Fishing rods can be stored in horizontal positions in cradle shaped concave recesses so that the fishing rods can be between the surfboards/table tops and the horizontal beams. A storage bag can be used to carry and transport a folded tabletop and folded legs and beams.

6 Claims, 11 Drawing Sheets

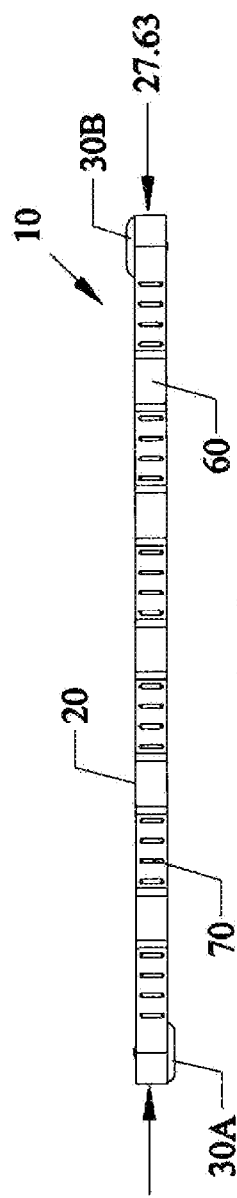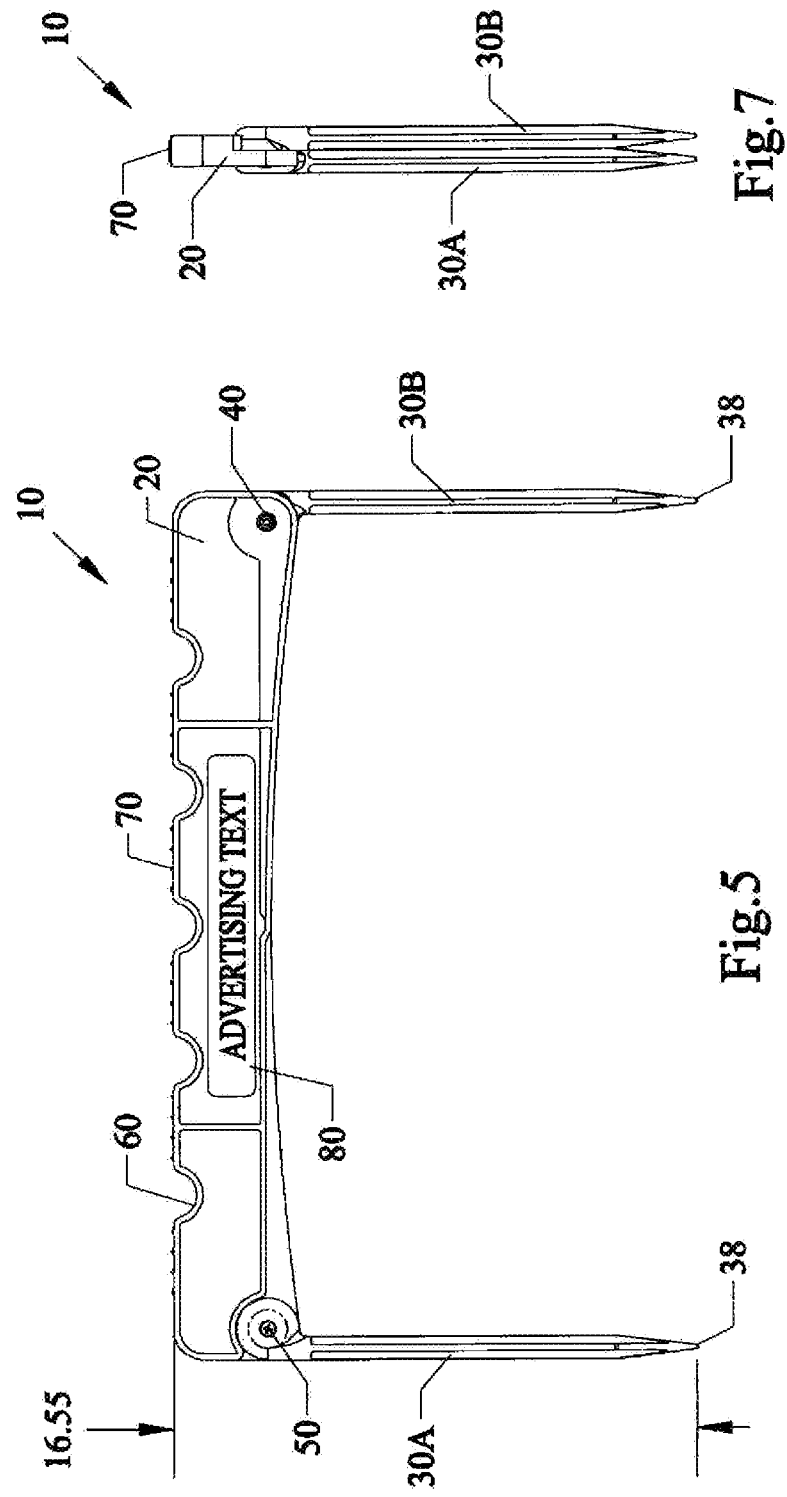

PORTABLE SURF BOARD RACK AND HOLDER

This invention relates to outdoor storage, in particular to devices, apparatus, systems and methods for supporting and holding items including surfboards, fishing rods, beach items and tabletops in horizontal positions raised above ground surfaces such as at the beach, and be easily transported, assembled, and disassembled when not being used.

BACKGROUND AND PRIOR ART

Surfboards usually cost in the hundreds of dollars or more often are not being used when taken to beaches, and the like, so that the boards must be safely located. The temporary storage of surfboards while the surfer is at the beach but not actually in the water surfing, presents a dilemma. Surfboard decks are coated in surfwax in order to provide a tacky and sticky surface for traction for standing while at the same time not being so abrasive as to be uncomfortable while the surfer is lying prone on the surfboard deck. This wax-covered deck is particularly problematic during the interludes between surfing sessions. Laying the surfboard deck-side down in the sand or on other surfaces typically results in the deck wax collecting loose debris such as sand, grass, and the like, resulting in the surfboard deck surface becoming abrasive and being quite uncomfortable when the surfer is lying prone on the board, for example, while paddling the surfboard. Conversely, laying the surfboard deck-side up exposes the wax to the sun and the wax will melt and run off the surfboard. Various types of surfboard storage devices have been developed over the years to store the surfboard.

Since, wax is often applied to the surfboard deck side, this results in a tacky and sticky nature on at least one side of the board. As described above, laying the boards down on the ground such as the sand can often result in the surfboard deck allow for blowing debris such as loose particles, such as sand, grass, and the like, getting stuck the sticky/tacky surfboard deck. Merely, turning the board over does not overcome the problem since the sticky/tacky deck side is very close to the ground surface. Also, laying the surfboard on the ground does not allow the surfer to be able to apply new wax coating to the surfboard deck for at least the same reasons.

Various types of surfboard storage devices have been developed over the years to store the surfboard.

U.S. Pat. Nos. 5,733,000 to Stump, 5,211,364 to James; Des. 352,628 to James, and U.S. Patent Application Publication 2009/0039225 to Taylor, each describe holder type clips for supporting single surfboards to the ground. However, the surfboards are turned on their side edges so that one long side edge of the surfboards is positioned close to the ground. Similar to the problems described above, the close ground location will still allow for debris such as sand and grass to become stuck to the sticky/tacky wax coating on the surfboard deck. Additionally, the side edge placement will not allow users to reapply to coatings of wax to the surfboard deck.

U.S. Pat. Nos. 5,833,079 to Roberts; 6,390,309 to Tucker, and U.S. Patent Application Publications: 2003/0178382 to Tucker; 2007/0102380 to Shaw; and 2007/0125731 to Waterman describe storage racks. However, these devices be vertically oriented and be mounted to walls or to large stands, and have the surfboards also turned on their sides with the lowest row also close to the ground. In addition to the problems with the ground holder clips described above, these devices would be impractical to transport, assemble and use, and later disassemble in outdoor environments such as on the beach by single users.

U.S. Pat. Nos. 2,874,003 to Humphries; 2,897,911 to Bowers; 3,276,545 to D'Angelo; Des. 381, 853 to Funcich; and D562,016 to Tomasch et al. each show sawhorse type stands that can be used to support surfboards. However, the individual sawhorses cannot be easily folded up to be easily transported since they would be difficult to carry from place to place. Thus, these sawhorse type devices would be impractical for use by individual surfers for transport, assembly, disassembly, and the like.

Additionally, the above devices cannot be used to support other items at the beach such as fishing poles and the like.

Thus, the need exists for solutions to the above problems with the prior art.

SUMMARY OF THE INVENTION

A primary objective of the present invention is to provide devices, apparatus, systems and methods for supporting and holding items including surfboards, fishing rods, and tabletops in horizontal orientations raised above ground surfaces such as at the beach, that can be easily transported from place to place.

A secondary objective of the present invention is to provide devices, apparatus, systems and methods for supporting and holding items including surfboards, fishing rods, and tabletops in horizontal orientations raised above ground surfaces such as at the beach, that can be easily assembled at different locations.

A third objective of the present invention is to provide devices, apparatus, systems and methods for supporting and holding items including surfboards, fishing rods, and tabletops in horizontal orientations raised above ground surfaces such as at the beach, that can be easily disassembled when not being used.

A fourth objective of the present invention is to provide devices, apparatus, systems and methods for supporting and holding items including surfboards, fishing rods, and tabletops in horizontal orientations raised above ground surfaces, on supports where the height of the supports ensures the surfboards etc., are high enough to avoid blowing sand, but low enough to avoid being picked up and blown over by the wind.

A preferred transportable storage rack, can include a first horizontal beam having a opposing ends, a first pair of legs, each of the legs having an upper end and a lower end, a first pair of pivotal members for pivotally attaching the opposing ends of the first horizontal beam to each upper end of each leg of the first pair of legs, the first pair of legs having a folded position with the legs parallel and next to the first horizontal beam, and an extended position with the legs substantially perpendicular to the first horizontal beam, a second horizontal beam having a opposing ends, a second pair of legs, each of the legs having an upper end and a lower end, and a second pair of pivotal members for pivotally attaching the opposing ends of the second horizontal beam to each upper end of each leg of the second pair of legs, the second pair of legs having a folded position with the legs parallel and next to the second horizontal beam, and an extended position with the legs substantially perpendicular to the second horizontal beam.

The lower end of each leg in the first pair of legs and the second pair of legs each can include a stake bottom for inserting into a ground surface when the legs are in the substantially perpendicular position.

Raised rib edges can be on an upper surface of each of the first horizontal beam and the second horizontal beam, the raised rib edges for minimizing surface contact with the with the surfboard deck to minimize disruption of the wax pattern (that was applied to the deck) and for enhancing a grip with an object to be laid on top of the first horizontal beam and on the second horizontal beam.

A surfboard can be laid down flat across a top surface of both the first horizontal beam and the second horizontal beam.

A tabletop can be laid down flat across a top surface of both the first horizontal beam and the second horizontal beam.

A plurality of cradle shaped concave recesses can be located along each of top surface of both the first horizontal beam and the second horizontal beam. At least one fishing rod can be supported in a horizontal position in a pair of cradle shaped recesses.

Both raised rib edges can be located on an upper surface of each of the first horizontal beam and the second horizontal beam, the raised rib edges for enhancing a grip with an object to be laid on top of the first horizontal beam and on the second horizontal beam, and a plurality of cradle shaped concave recesses can be located along each of top surface of both the first horizontal beam and the second horizontal beam.

A surfboard can be laid down flat across a top of the raised rib edges of both the first horizontal beam and the second horizontal beam, and at least one fishing rod can be supported in a horizontal position in the plurality of cradle shaped concave recesses, so that the at least one fishing rod is between the surfboard and the first and the second horizontal beams.

A tabletop can be laid down flat across a top of the raised rib edges of both the first horizontal beam and the second horizontal beam, and at least one fishing rod can be supported in a horizontal position in the plurality of cradle shaped concave recesses, so that the at least one fishing rod is between the tabletop and the first and the second horizontal beams.

A storage bag can be included where the tabletop is folded along hinged sides, and the beams and legs are folded into a storage configuration, so that the folded tabletop and folded beams and legs fit into the storage bag for transport.

A preferred method of assembling a storage rack, can include the steps of providing a first horizontal beam having a opposing ends, providing a first pair of legs, each legs having an upper end and a lower end, pivotally attaching the opposing ends of the first horizontal beam to each upper end of each leg of the first pair of legs, the first pair of legs having a folded position with the legs parallel and next to the first horizontal beam, and an extended position with the legs substantially perpendicular to the first horizontal beam, providing a second horizontal beam having a opposing ends, providing a second pair of legs, each legs having an upper end and a lower end, and pivotally attaching the opposing ends of the second horizontal beam to each upper end of each leg of the second pair of legs, the second pair of legs having a folded position with the legs parallel and next to the second horizontal beam, and an extended position with the legs substantially perpendicular to the second horizontal beam.

The method can include inserting the pointed lower end of each leg of the first pair of legs into a ground, and inserting the pointed lower end of each leg of the second pair of legs into the ground.

The method can include the steps of providing raised rib edges on an upper surface of each of the first horizontal beam and the second horizontal beam, and laying a surfboard in a flat horizontal position across a top surface of both the first horizontal beam and the second horizontal beam. The raised rib edges allow for minimizing surface contact with the with the surfboard deck to minimize disruption of the wax pattern (that was applied to the deck) and for enhancing a grip with an object to be laid on top of the first horizontal beam and on the second horizontal beam.

The method can include the steps of providing raised rib edges on an upper surface of each of the first horizontal beam and the second horizontal beam, and laying a tabletop flat across a top surface of both the first horizontal beam and the second horizontal beam, wherein the raised rib edges enhance the grip between the rack and the surfboard.

The method can include the steps of providing a plurality of cradle shaped recesses along each of top surface of both the first horizontal beam and the second horizontal beam, and positioning at least one fishing rod to be supported in a horizontal position in the plurality of cradle shaped recesses.

The method can include the steps of providing raised rib edges on an upper surface of each of the first horizontal beam and the second horizontal beam, laying a surfboard in a flat horizontal position across a top surface of both the first horizontal beam and the second horizontal beam, wherein the raised rib edges enhance the grip between the rack and the surfboard, providing a plurality of cradle shaped recesses along each of top surface of both the first horizontal beam and the second horizontal beam, and positioning at least one fishing rod to be supported in a horizontal position in the plurality of cradle shaped recesses, wherein the at the least one fishing rod is positioned between the surfboard and the first and the second horizontal beams.

The method can include the steps of providing raised rib edges on an upper surface of each of the first horizontal beam and the second horizontal beam, laying a tabletop in a flat horizontal position across a top surface of both the first horizontal beam and the second horizontal beam, wherein the raised rib edges enhance the grip between the rack and the tabletop, providing a plurality of cradle shaped recesses along each of top surface of both the first horizontal beam and the second horizontal beam, and positioning at least one fishing rod to be supported in a horizontal position in the plurality of cradle shaped recesses, wherein the at the least one fishing rod is positioned between the tabletop and the first and the second horizontal beams.

The method can include the steps of providing a storage bag, folding the tabletop along hinged sides, folding the beams and legs into a storage configuration, inserting the folded tabletop and the folded beams and legs into the bag, and transporting the bag with the folded tabletop and the folded beams and legs from place to place.

Further objects and advantages of this invention will be apparent from the following detailed description of the presently preferred embodiments which are illustrated schematically in the accompanying drawings.

BRIEF DESCRIPTION OF THE FIGURES

FIG. 5 is a front view of the support of FIG. 1 with both legs deployed.

FIG. 6 is a top view of the support of FIG. 1 with both legs deployed.

FIG. 7 is a right side view of FIG. 6 with legs both deployed.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A listing of components used in the figures will now be described.
10. Novel surfboard support.
20. Main beam.
22. Recessed socket
23. Opening in socket
30A, 30B. Folding legs incorporates a stop when fully open. Legs are pointed to act as a spike in the sand at the beach.
32. Upper cylindrical end of leg with male side
33. Opening in cylindrical end
38. Bottom of legs 30A, 30B (pointed stake end)
40. Hex nut.
50. Screw (with hex nut) secures leg to main beam.
60. Cradle to hold fishing pole.
70. Ribs provide non-slip surface for surfboard and table support. The ribs can be molded into the plastic or rubber add-ons.
80. Raised or recessed area for advertising text.
90. Sand.
100. Surfboard.
110. Washer.
120. Folding tabletop.
122. Slats in table
125. Hinges for slats
130. Fishing pole.
140. Carry bag for table and Novel
150. Tie cord to close carry bag.

Figure 1:
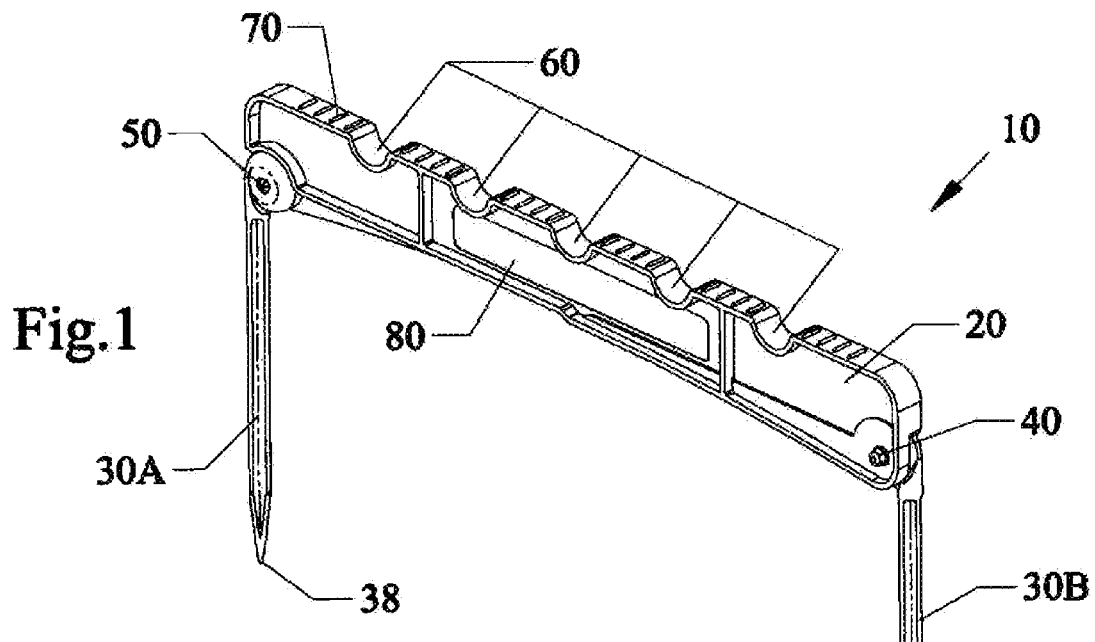
FIG. 1 is a front perspective view of the surfboard support with legs deployed.
Figure 2:
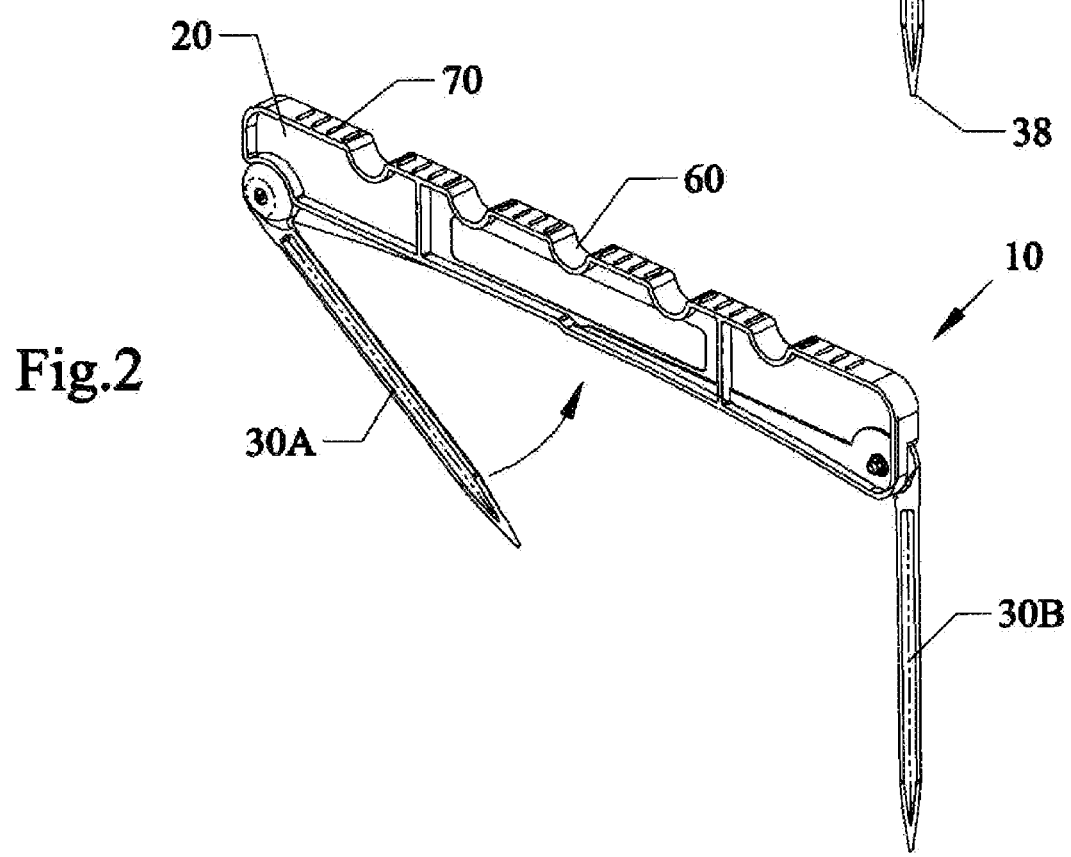
FIG. 2 is another view of support of FIG. 1 with one leg folding up.
Figure 3:
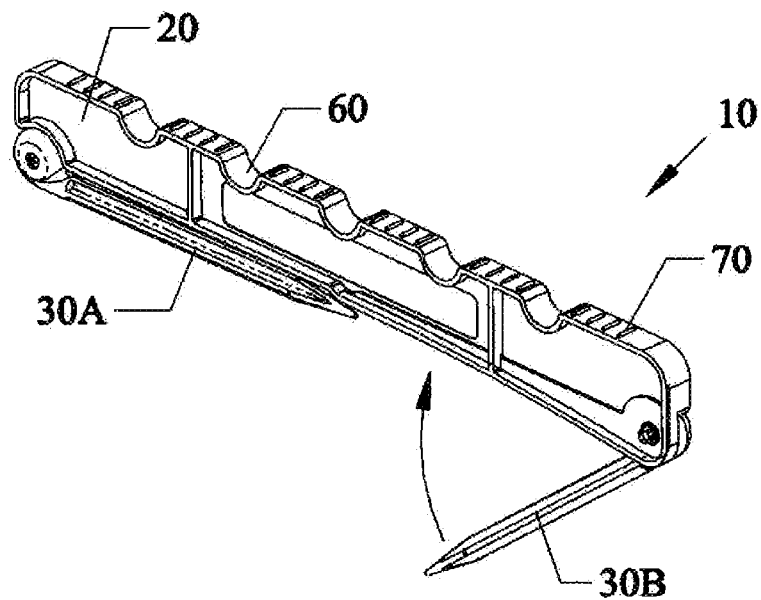
FIG. 3 is another view of the support of FIG. 1 with one leg folded up and second leg beginning to fold.
Figure 4:
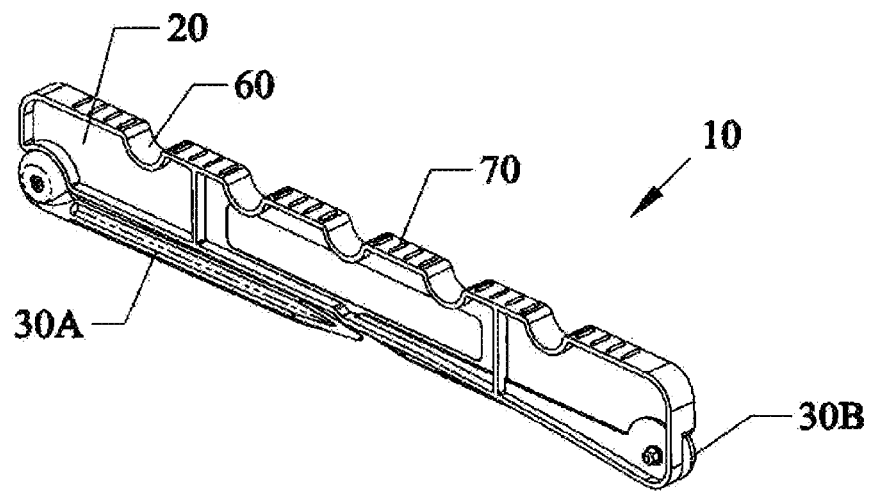
FIG. 4 is another view of the support of FIG. 1 with both legs folded up.

FIG. 1 is a front perspective view of the surfboard support 10 with legs 30 deployed. FIG. 2 is another view of support 10 of FIG. 1 with one leg folding up. FIG. 3 is another view of the support of FIG. 1 with one leg 30A folded up and second leg 30B beginning to fold. FIG. 4 is another view of the support of FIG. 1 with both legs 30A, 30B folded up. FIG. 5 is a front view of the support 10 of FIG. 1 with both legs 30A, 30B deployed. FIG. 6 is a top view of the support 10 of FIG. 1 with both legs 30A, 30B deployed. FIG. 7 is a right side view of FIG. 6 with legs 30A, 30B both deployed.

Figure 16:
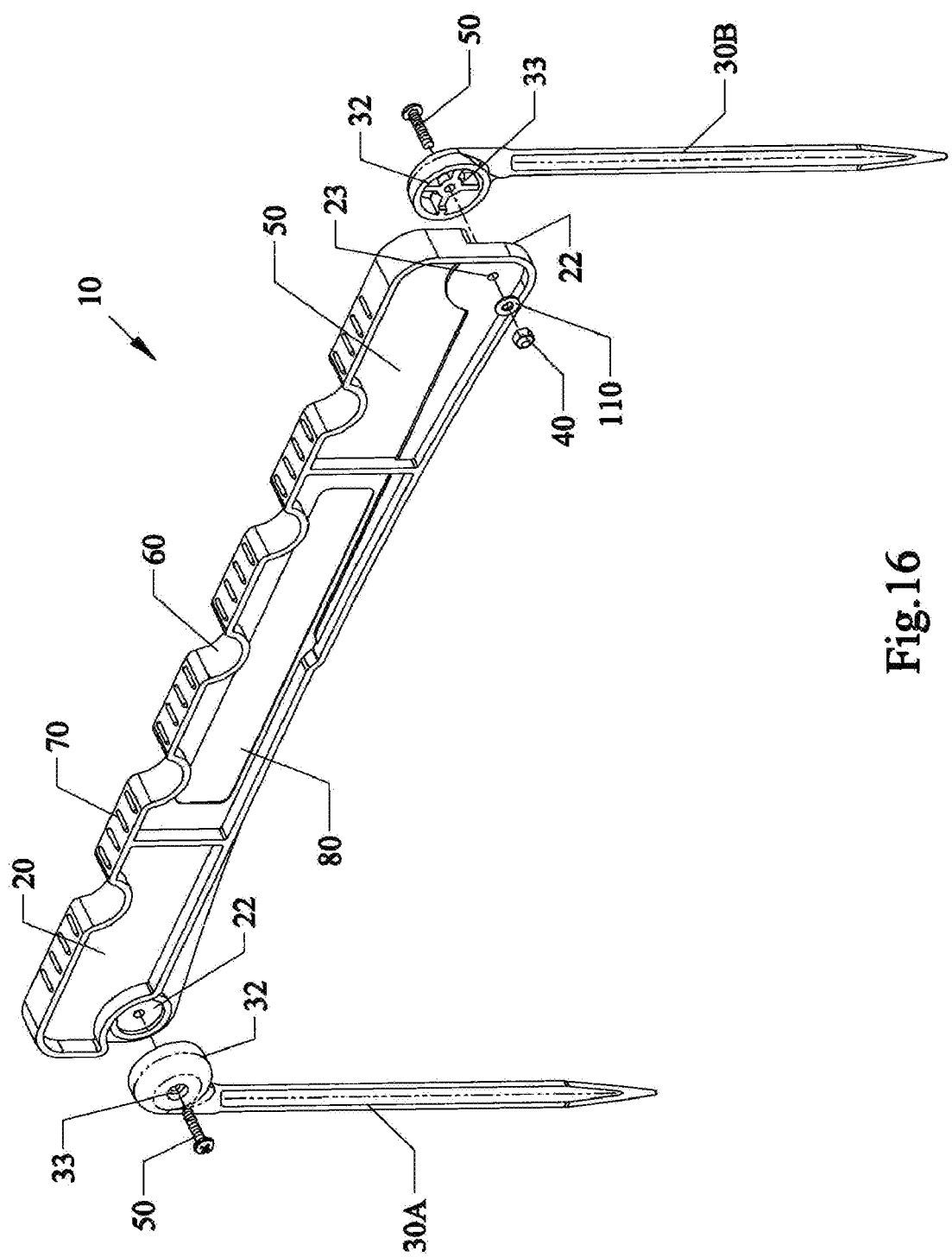
FIG. 16 is a perspective exploded view of one support with pivotal legs.

FIG. 16 is a perspective exploded view of one support 10 with the pivotal legs 30A, 30B detached from the main beam 20.

Referring to FIGS. 1-5, and 16, the support 10 can include a main beam 20 that can have a rectangular configuration and have a length of approximately 27.63 inches (or approximately 2¼ feet long). The beam 20 can be formed from molded plastic and the like, and have perimeter edges with widths larger than widths across the middle 80, and include strengthening ribs running between the top and bottom of the beam for strengthening the beam 20 without adding excessive material and weight to the beam 20.

On top of the beam 20 can be a plurality of raised ribs (raised edges) 70 that provide a non-slip surface for allowing a surfboard (100) or tabletop (120) to be supported thereon. The ribs (raised edges) 70 can be molded into the beam 120 (if the beam is made of plastic). Alternatively, the ribs 70 can be made of other materials such as rubber type stoppers, and the like, as add-ons, that can be adhesively attached, fastened thereon by fasteners, and the like. Alternatively, the ribs can be raised surfaces on a pad surface that can be adhesively laid on top of the beams(s) 20. The raised rib edges allow for minimizing surface contact with the with the surfboard deck to minimize disruption of the wax pattern (that was applied to the deck) and for enhancing a grip with an object to be laid on top of the first horizontal beam and on the second horizontal beam.

On top of the main beam 20 can also be a plurality of cradle shaped concave shaped recesses 60 spaced apart from one another. Although, a plurality are shown, the invention can work with a single cradle shaped recess 60 or none where they are not needed. The recess(es) 60 can be used to support elongated objects such as fishing poles and the like, which will be described and shown later in more detail.

Across at least one side face of the beam(s) 20 can be a surface area 80, that can be recessed for receiving and displaying advertising indicia, thereon. Alternatively, the surface area 80 can be raised, for receiving and displaying advertising indicia thereon.

Referring to FIGS. 1-5 and 16, the upper cylindrical end 32 with male side of the legs 30A, 30B can be attached to recessed sockets 22 on the lower corner ends of the beam 20 by fastener(s) 50, such as screws, and the like, passing through opening(s) 33 in the cylindrical upper end 32, and held in place with hex type nut(s) 40 and washer(s) 110 on the other side of the opening 23 in the socket(s) 22 that secure each leg 30A, 30B to the opposite ends of the beam 20. The fastener(s) 50, nut(s) 40 and washer(s) 110 allow for the legs 30A, 30B to pivot from storage positions with the legs 30A, 30B parallel to and side by side the beam 20 (FIG. 4) to extended positions with the legs 30A, 30B perpendicular to the beam 20 (FIG. 1, 5). In the extended position, the height of the beam 20 to the bottom 38 of the legs 30A, 30B, can have a height of approximately 16.55 inches (or approximately 1⅓ feet). Testing revealed the vertical leg length is important to ensure surfboard is high enough to avoid blowing sand, but low enough to avoid being picked up and blown over by the wind.

Figure 8:
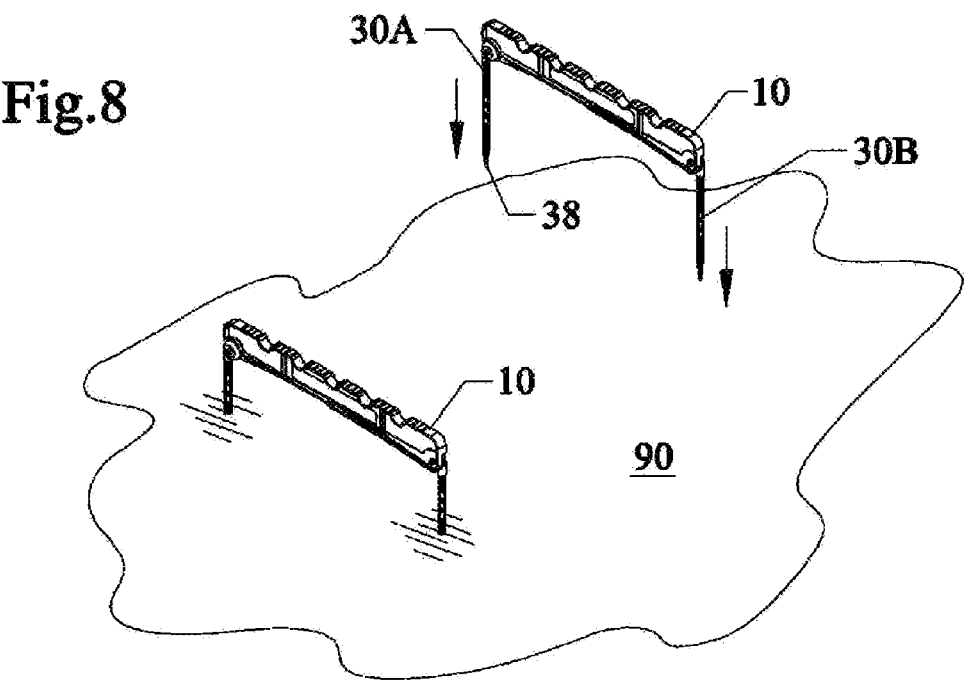
FIG. 8 is a perspective view of two supports with deployed legs being staked into a ground surface such as sand.

FIG. 8 is a perspective view of two supports with deployed legs being staked into a ground surface 90 such as sand, by inserting the stake ends 38 (which can be pointed) of the legs 30A, 30B of the support 10 into the ground surface 90. The supports 10 can be spaced apart so that the beams 20 are parallel to one another, and the legs 30A, 30B can be inserted into the ground until the beams 20 are stable and do not move. For example, leaving a space of approximately ½ a foot or more between the bottom of the beam and the top of the ground surface 90.

Figure 9:
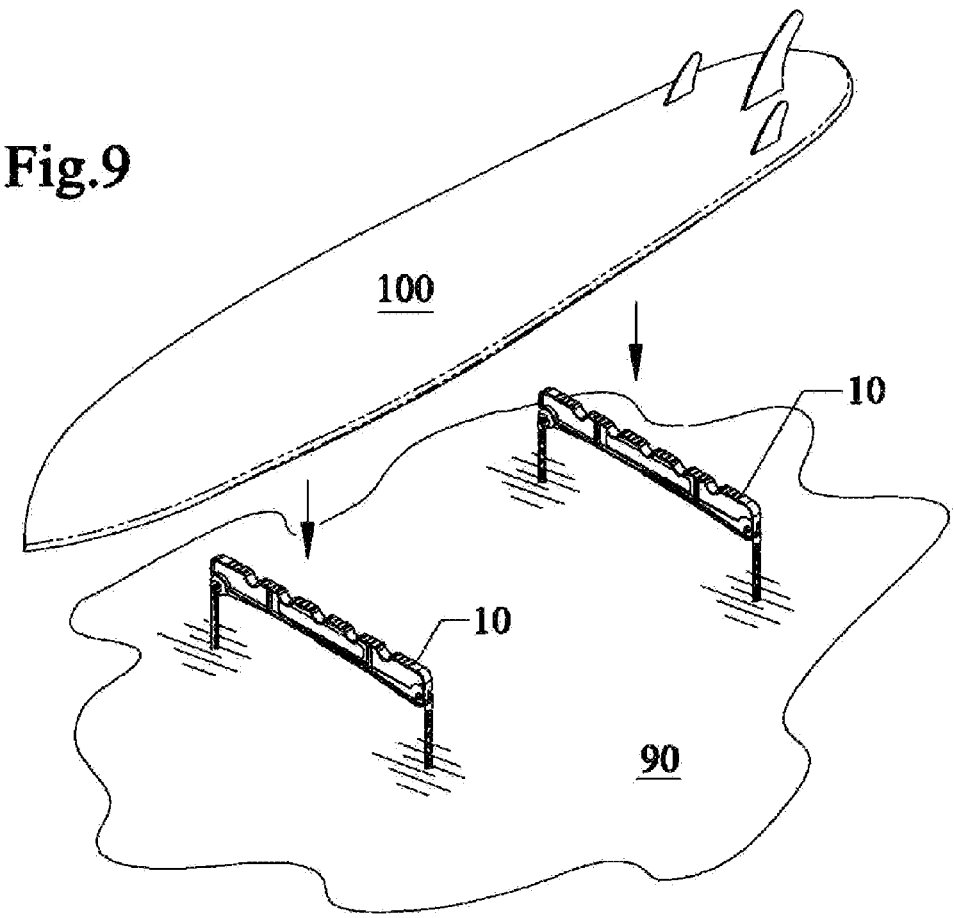
FIG. 9 is another view of two supports of FIG. 8 staked in the ground ready to support a surfboard.
Figure 10:
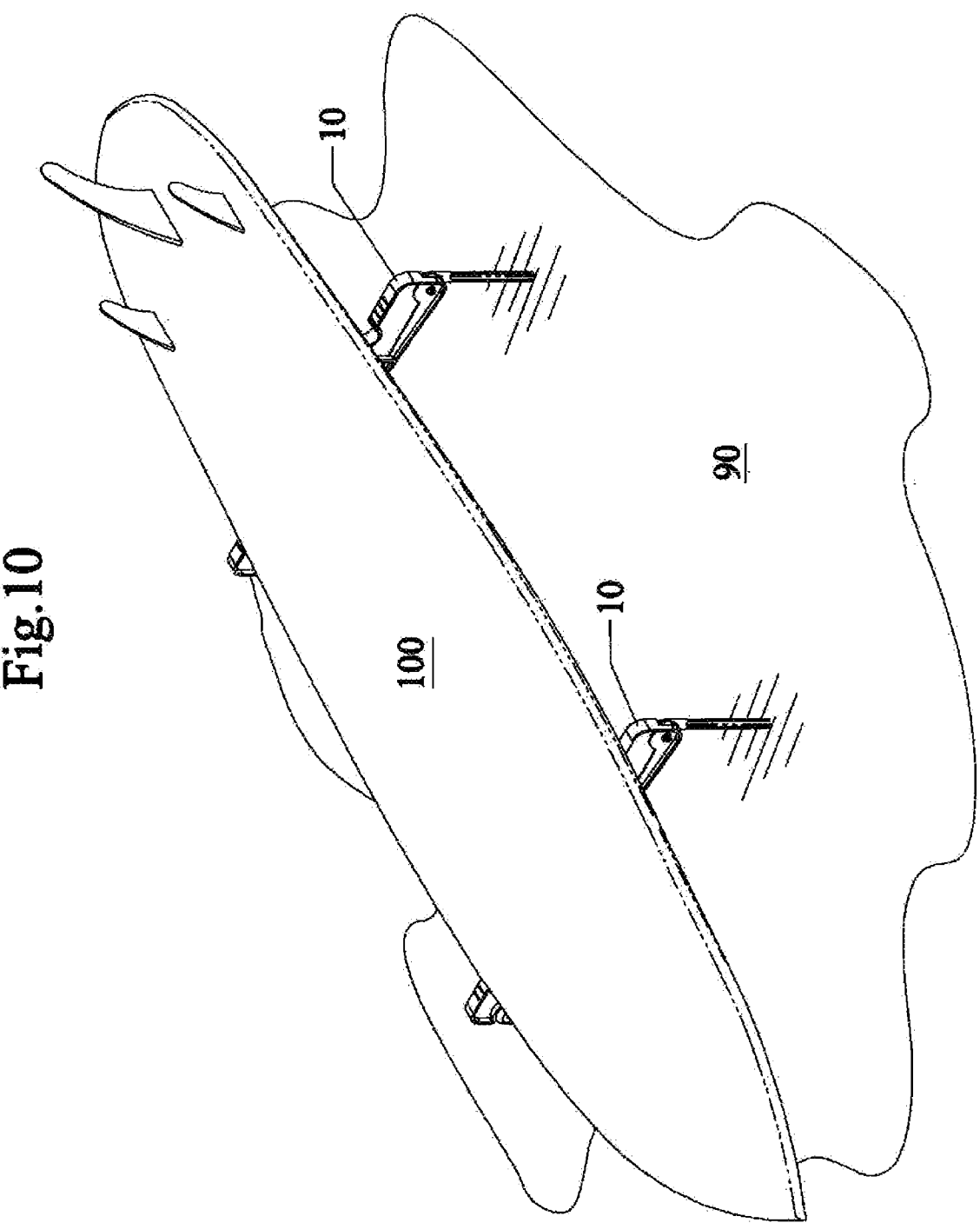
FIG. 10 is a perspective view of a surfboard being supported by two supports of FIG. 9 that are staked into the ground (sand) surface.
Figure 11:
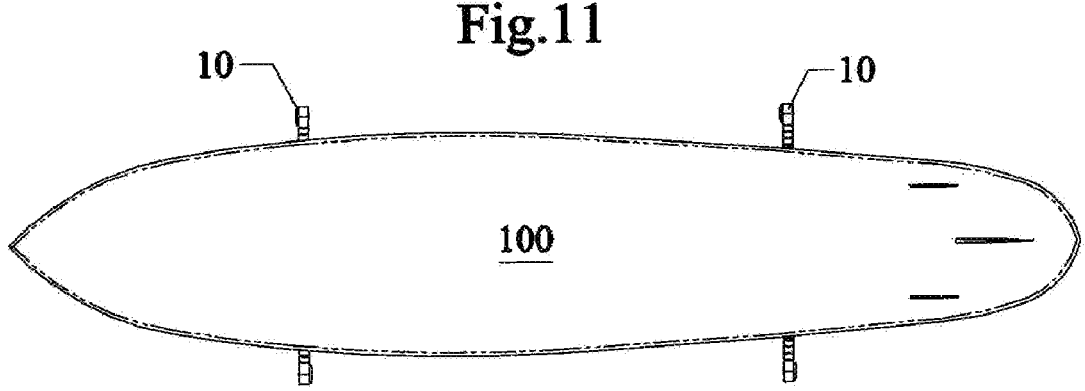
FIG. 11 is a top view of the surfboard being supported by two supports of FIG. 10.
Figure 12:
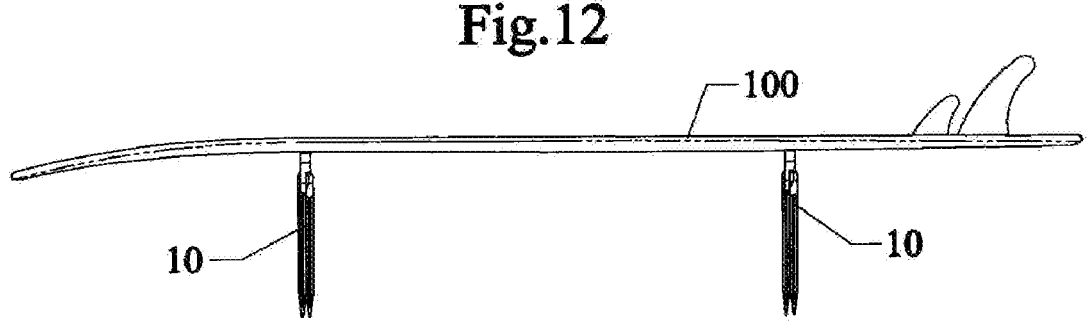
FIG. 12 is a side view of the surfboard being supported by two supports of FIG. 10.
Figure 13:
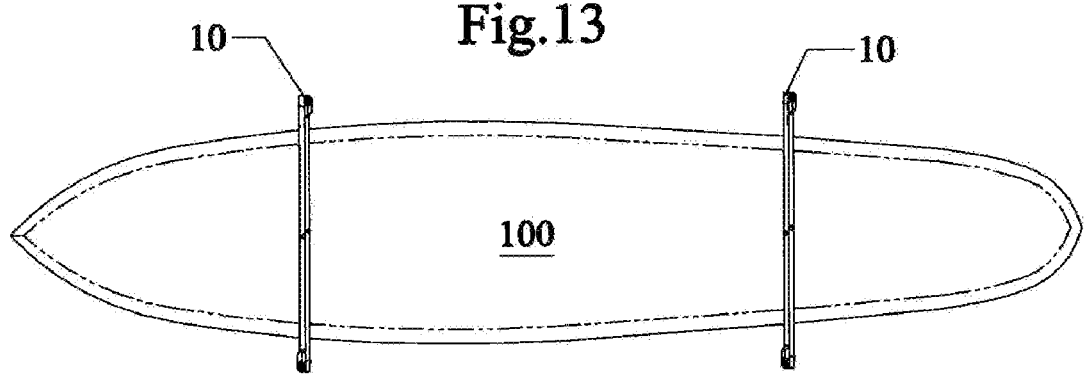
FIG. 13 is a bottom view of the surfboard being supported by two supports of FIG. 10.
Figure 14:
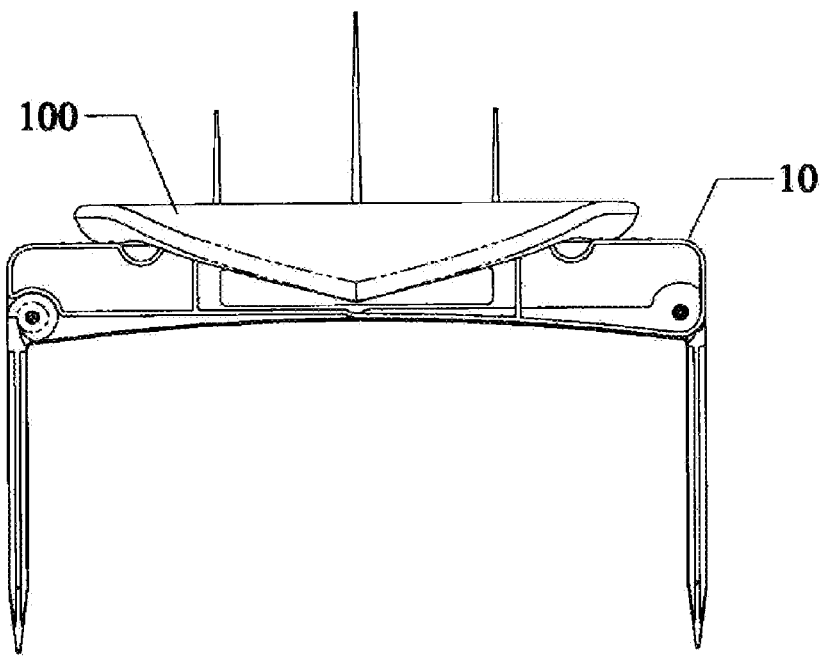
FIG. 14 is a right end view of the surfboard being supported by two supports of FIG. 10.
Figure 15:
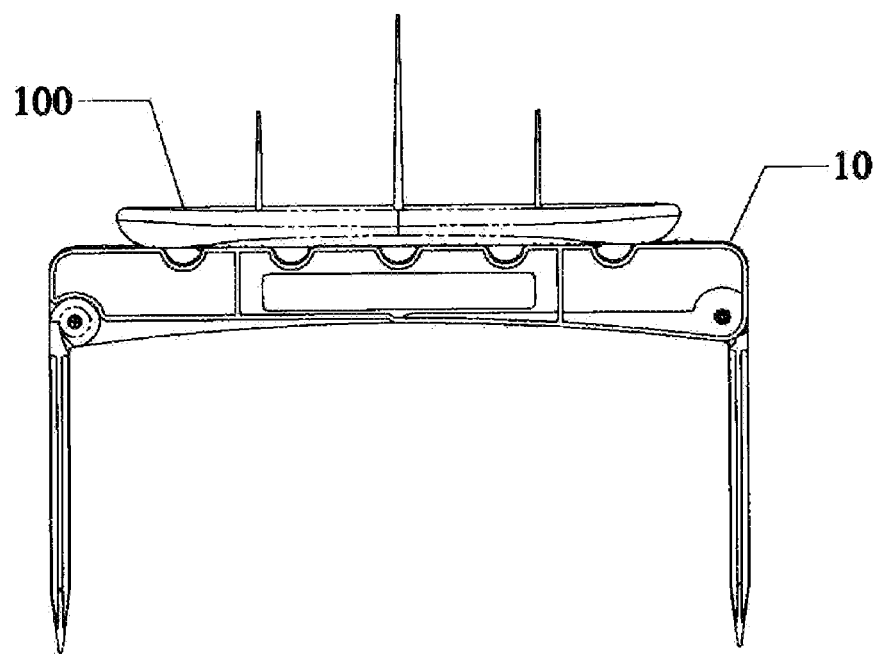
FIG. 15 is a left end view of the surfboard being supported by two supports of FIG. 10.

FIG. 9 is another view of two supports 10 of FIG. 8 staked in the ground 90 ready to support a surfboard. FIG. 10 is a perspective view of a surfboard 100 being supported by two supports 10 of FIG. 9 that are staked into the ground (sand) surface 90 with the surfboard deck facing down. FIG. 11 is a top view of the surfboard 100 being supported by two supports 10 of FIG. 10. FIG. 12 is a side view of the surfboard 100 being supported by two supports 10 of FIG. 10. FIG. 13 is a bottom view of the surfboard 100 being supported, by two supports 10 of FIG. 10. FIG. 14 is a right end view of the surfboard 100 being supported by two supports 10 of FIG. 10. FIG. 15 is a left end view of the surfboard 100 being supported by two supports 10 of FIG. 10.

Referring to FIGS. 9-15, the surfboard deck (which can be facing downward) can have a waxed surface that is kept in a fixed orientation spaced above the ground surface so as not to allow debris such as sand and the like from coming into direct contact with the surfboard deck. The raised ribs (raised edges) 70 on the top of the beams 20 of the supports 10 create a non-slip surface so that the surfboard 100 will not slip off the beams 20, and onto the ground surface 90.

Figure 17:
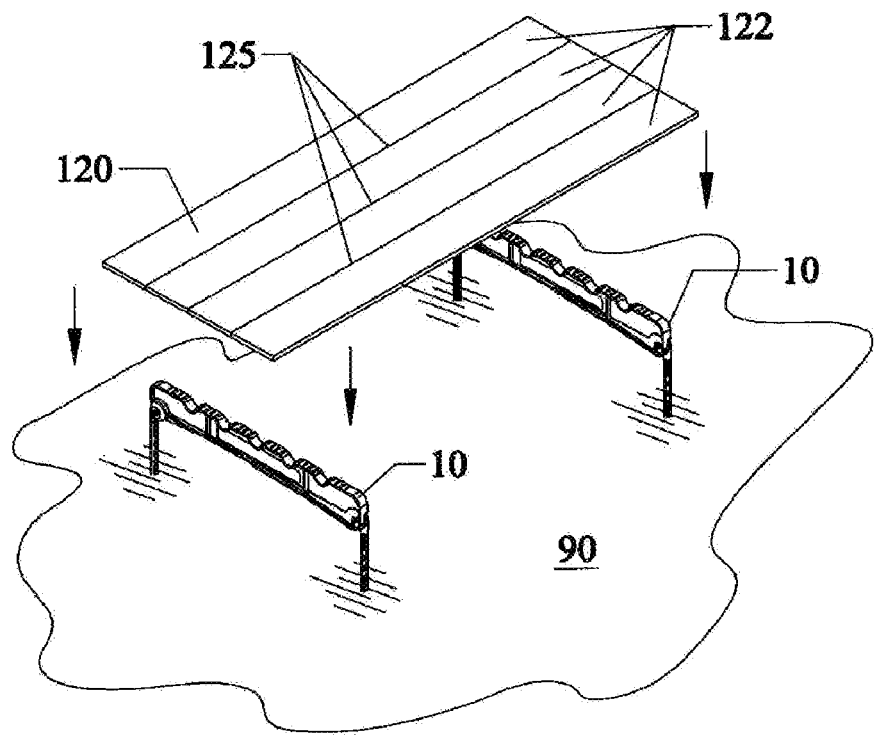
FIG. 17 is a perspective view of two supports staked into the ground (sand) surface ready to support a folding tabletop.
Figure 18:
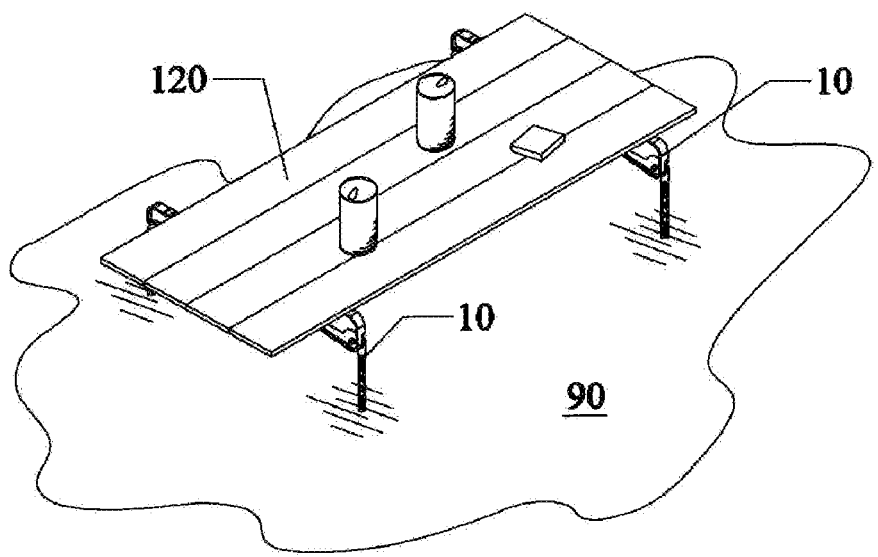
FIG. 18 is a perspective view of two supports staked into the ground (sand) surface supporting the folding tabletop.

FIG. 17 is a perspective view of two supports 10 staked into the ground (sand) surface 90 ready to support a folding tabletop 120. The folding table top 120 can be formed from rectangular type slats 122 that are attached side by side to one another by hinges 125. FIG. 18 is a perspective view of two supports 120 staked into the ground (sand) surface 90 supporting the folding tabletop 120. The tabletop can be used to support items, such as but not limited to beverages, foods, electronics, bags, sunglasses, suntan lotion, and the like, and keep such items off the ground.

Figure 19:
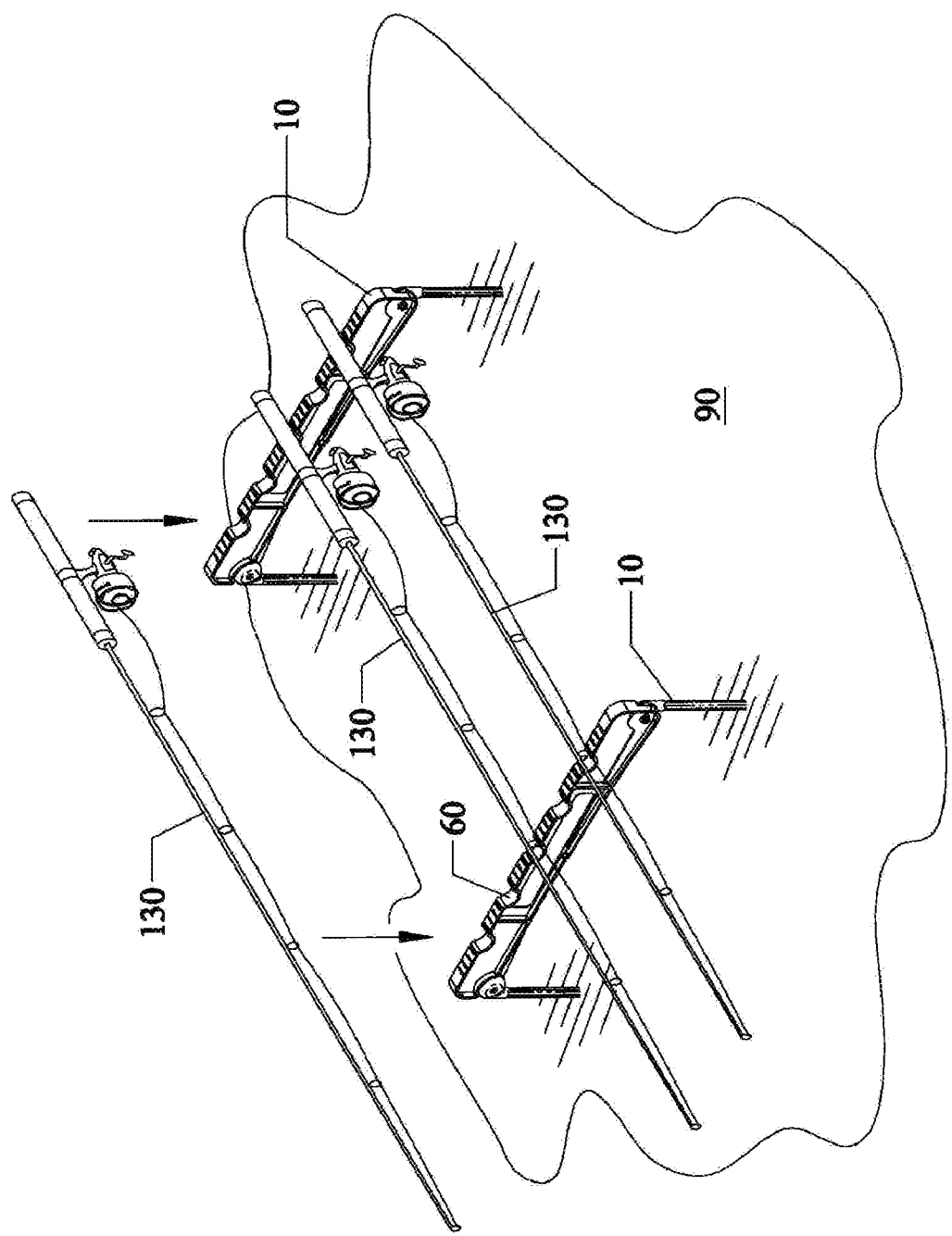
FIG. 19 is a perspective view of two supports staked into the ground (sand) surface with fishing poles being held in the molded-in cradles.

FIG. 19 is a perspective view of two supports 10 staked into the ground (sand) surface 90 with fishing poles 130 being held in the molded-in cradle shaped recesses 60. A plurality of recesses 60 in each beam 20, can allow for a plurality of fishing poles 130 to be supported in horizontal orientations above the ground surface 90. The invention will also allow for a table top 120 to be placed over fishing poles 130 so as to further protect the fishing poles 130.

Figures 20, 21:
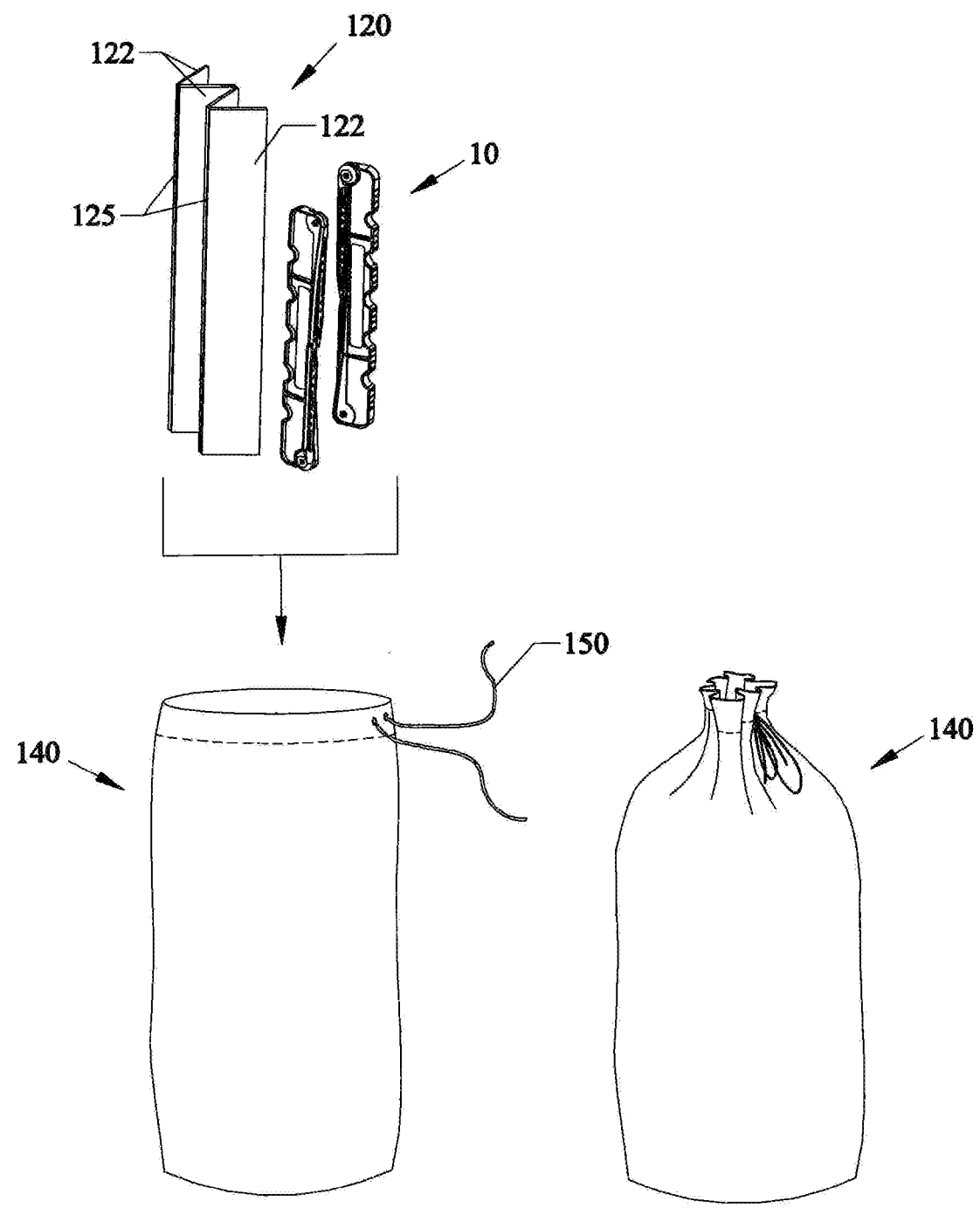
FIG. 20 is a perspective exploded view of folded supports and folded tabletop ready to put in the carry bag.
FIG. 21 is another view of the folded components in the carry bag of FIG. 20 with the bag secured by tie cord.

FIG. 20 is a perspective exploded view of supports 10 with folded legs 30A, 30B (previously shown in FIG. 4 and folded tabletop 120 ready to put in a carry bag 140. The supports 10 can be folded up into the storage position that was previously described. The tabletop 120 can be folded up into an accordion configuration by folding slats 122 along hinges 125. FIG. 21 is another view of the folded components inside the carry bag 140 of FIG. 20 with the bag 140 secured by a pulled tie cord 150. Thus, the invention can be easily carried in one hand and transported place to place and easily assembled and disassembled as shown and described in regard to the previous figures.

While the invention shows surfboards and tabletops on the supports, other objects can be placed on the supports. For example, towels, can be placed on the raised beams, and the like.

Although the invention is shown and described as using two supports staked into the ground, the invention can be practiced with a single support staked in the ground, where the towels, can be draped across the beam(s). Alternatively, the boards can be also placed on side edges, against the beams.

Additionally, the invention can be used anywhere outdoors, such as but not limited to for camping, fishing, picnicking, or beachgoing, where the desirability of a functional and portable support system is needed.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A transportable storage rack, comprising:
   a first horizontal beam having opposing ends and an upper surface;
   a plurality of first cradle shaped concave recesses on the upper surface of the first horizontal beam;
   a plurality of first raised rib edges on the upper surface of the first horizontal beam located between the first cradle shaped concave recesses, the raised rib edges for enhancing a gripping surface thereon;
   a first pair of legs, each of the legs having an upper end and a lower end;
   a first pair of pivotal members for pivotally attaching the opposing ends of the first horizontal beam to each upper end of each leg of the first pair of legs, the first pair of legs having a folded position with the legs parallel and next to the first horizontal beam, and an extended position with the legs substantially perpendicular to the first horizontal beam;
   a second horizontal beam having opposing ends and an upper surface, the second horizontal beam being separate and unattached to the first horizontal beam;
   a plurality of second cradle shaped concave recesses on the upper surface of the second horizontal beam for supporting the first object therein;
   a plurality of second raised rib edges on the upper surface of the second horizontal beam located between the second cradle shaped concave recesses, the second raised rib edges for enhancing a grip with the second object to be laid on top of the second horizontal beam;
   a second pair of legs, each of the legs having an upper end and a lower end; and
   a second pair of pivotal members for pivotally attaching the opposing ends of the second horizontal beam to each upper end of each leg of the second pair of legs, the second pair of legs having a folded position with the legs parallel and next to the second horizontal beam, and an extended position with the legs substantially perpendicular to the second horizontal beam;
   a first object being a surfboard, the first object to be laid down flat across the upper surface of both the first horizontal beam and the second horizontal beam; and
   a second object including at least one fishing rod to be supported in a horizontal position in a pair of the first and the second cradle shaped recesses.

2. The transportable storage rack of claim 1, wherein the lower end of each leg in the first pair of legs and the second pair of legs each includes a stake bottom for inserting into a ground surface when the legs are in the substantially perpendicular position.

3. A method of assembling a storage rack, comprising the steps of:
providing a first horizontal beam having opposing ends;
providing a first pair of legs, each legs having an upper end and a lower end;
pivotally attaching the opposing ends of the first horizontal beam to each upper end of each leg of the first pair of legs, the first pair of legs having a folded position with the legs parallel and next to the first horizontal beam, and an extended position with the legs substantially perpendicular to the first horizontal beam;
providing a second horizontal beam having opposing ends;
providing a second pair of legs, each legs having an upper end and a lower end; pivotally attaching the opposing ends of the second horizontal beam to each upper end of each leg of the second pair of legs, the second pair of legs having a folded position with the legs parallel and next to the second horizontal beam, and an extended position with the legs substantially perpendicular to the second horizontal beam;
providing raised rib edges on an upper surface of each of the first horizontal beam and the second horizontal beam;
laying a surfboard in a flat horizontal position across the upper surface of both the first horizontal beam and the second horizontal beam wherein the raised rib edges enhance the grip between the rack and the surfboard;
providing a plurality of cradle shaped recesses along each of the upper surface of both the first horizontal beam and the second horizontal beam; and
positioning at least one fishing rod to be supported in a horizontal position in the plurality of cradle shaped recesses, wherein the at the least one fishing rod is positioned between the surfboard and the first and the second horizontal beams.

4. The method of claim 3, further comprising the steps of:
inserting the lower end of each leg of the first pair of legs into a ground; and
inserting the lower end of each leg of the second pair of legs into the ground.

5. A transportable storage rack, comprising:
a first horizontal beam having opposing ends;
a first pair of legs, each of the legs having an upper end and a lower end;
a first pair of pivotal members for pivotally attaching the opposing ends of the first horizontal beam to each upper end of each leg of the first pair of legs, the first pair of legs having a folded position with the legs parallel and next to the first horizontal beam, and an extended position with the legs substantially perpendicular to the first horizontal beam;
a second horizontal beam having opposing ends;
a second pair of legs, each of the legs having an upper end and a lower end;
a second pair of pivotal members for pivotally attaching the opposing ends of the second horizontal beam to each upper end of each leg of the second pair of legs, the second pair of legs having a folded position with the legs parallel and next to the second horizontal beam, and an extended position with the legs substantially perpendicular to the second horizontal beam;
raised rib edges on both the first horizontal beam and the second horizontal beam; and a plurality of cradle shaped concave recesses on both the first horizontal beam and the second horizontal beam; and
a surfboard to be laid down flat across a top of the raised rib edges of both the first horizontal beam and the second horizontal beam; and
at least one fishing rod supported in a horizontal position in the plurality of cradle shaped concave recesses, so that the at least one fishing rod is between the surfboard and the first and the second horizontal beams.

6. The transportable storage rack of claim 5, wherein the lower end of each leg in the first pair of legs and the second pair of legs each includes a stake bottom for inserting into a ground surface when the legs are in the substantially perpendicular position.

* * * * *